United States Patent
Onodera et al.

(10) Patent No.: US 9,308,594 B2
(45) Date of Patent: Apr. 12, 2016

(54) WIRE ELECTRICAL DISCHARGE MACHINING APPARATUS

(75) Inventors: Yasuo Onodera, Chiyoda-ku (JP); Takayuki Nakagawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/130,634

(22) PCT Filed: Jul. 6, 2011

(86) PCT No.: PCT/JP2011/065473
§ 371 (c)(1),
(2), (4) Date: Jan. 2, 2014

(87) PCT Pub. No.: WO2013/005315
PCT Pub. Date: Jan. 10, 2013

(65) Prior Publication Data
US 2014/0144885 A1    May 29, 2014

(51) Int. Cl.
*B23H 7/10* (2006.01)
*B23H 7/14* (2006.01)

(52) U.S. Cl.
CPC ............. *B23H 7/10* (2013.01); *B23H 7/104* (2013.01); *B23H 7/14* (2013.01)

(58) Field of Classification Search
CPC ...... B23K 9/013; B23K 35/0216; B23H 1/00; B23H 7/26; B23H 11/00; B23H 7/10; B23H 7/02; B23H 7/04; H01J 37/31
USPC ................. 219/69.12, 69.13, 69.11, 69.1
See application file for complete search history.

(56) References Cited

U.S. PATENT DOCUMENTS

| | | | | |
|---|---|---|---|---|
| 4,667,078 A * | 5/1987 | Kilcher | ................ | B23H 7/10 204/206 |
| 5,422,455 A * | 6/1995 | Sato | ................ | B23H 7/04 219/69.12 |
| 5,973,288 A | 10/1999 | Marchesi et al. | | |
| 7,795,558 B2 * | 9/2010 | Nakajima | ................ | B23H 1/10 219/69.14 |
| 2006/0070986 A1 * | 4/2006 | Ihde | ................ | B23K 9/1336 219/137.71 |
| 2013/0299459 A1 * | 11/2013 | Liu | ................ | B23H 7/08 219/69.12 |

FOREIGN PATENT DOCUMENTS

| | | | |
|---|---|---|---|
| JP | 02-116421 A | | 5/1990 |
| JP | 2599290 B2 | | 5/1990 |
| JP | 06-055359 A | | 3/1994 |
| JP | 06055359 A | * | 3/1994 |
| JP | 07-178621 A | | 7/1995 |
| JP | 07178621 A | * | 7/1995 |

(Continued)

*Primary Examiner* — Dana Ross
*Assistant Examiner* — Kuangyue Chen
(74) *Attorney, Agent, or Firm* — Sughrue Mion, PLLC; Richard C. Turner (57) ABSTRACT

In order to detect a wire breakage as soon as possible, the wire electrical discharge machining apparatus includes a speed fluctuation compensator that generates a speed fluctuation suppression command that is a speed compensation value that suppresses fluctuation of the rotational speed of the tension motor on the basis of the rotational speed of the tension motor and a breakage detecting device that detects a breakage of the wire electrode on the basis of a comparison of a preset breakage detection threshold and a speed fluctuation suppression command output from the speed fluctuation compensator.

10 Claims, 9 Drawing Sheets

(56) References Cited

FOREIGN PATENT DOCUMENTS

| JP | 08-197335 A | 8/1996 |
| JP | 08-215939 A | 8/1996 |
| JP | 08197335 A * | 8/1996 |
| JP | 08215939 A * | 8/1996 |
| JP | 10-309631 A | 11/1998 |
| JP | 2003-103418 A | 4/2003 |
| JP | 2003103418 A * | 4/2003 |

* cited by examiner

WIRE ELECTRICAL DISCHARGE MACHINING APPARATUS

CROSS REFERENCE TO RELATED APPLICATION

This application is a National Stage of International Application No. PCT/JP2011/065473, filed on Jul. 6, 2012, the contents of all of which are incorporated herein by reference in their entirety.

FIELD

The present invention relates to a wire electrical discharge machining apparatus.

BACKGROUND

In conventional wire electrical discharge machining apparatuses, the machining conditions are adjusted such that the machining energy is increased in order to improve the machining speed. However, when the machining energy is increased, the wire electrode becomes easy to break. Moreover, the wire becomes easy to break due to the aging of the components of the wire travelling system. Furthermore, when a workpiece is machined into a shape that tends to make machining unstable, the wire also becomes easy to break. If the machining power supply and wire traveling are not stopped immediately after the wire breaks, electrical discharge occurs at places other than at the workpiece, which is dangerous. Consequently, it is necessary to mount wire breakage detecting devices on wire electrical discharge machining apparatuses.

Wire breakage detecting devices include one that uses a method of detecting a wire breakage from the difference in the rotational speed between the rotational components on the wire traveling path (for example, see Patent Literature 1). With this method, the rotational speed is detected at any two of the wire supplying bobbin around which the wire electrode is wound, the tension roller that applies tension to the wire electrode paid out from the bobbin, the collecting roller that collects the wire electrode at a predetermined speed, and the guide pulley that stabilizes the wire electrode as it travels and changes the traveling direction, and then, when the difference in the rotational speed exceeds a predetermined value, it is detected that a breakage has occurred.

CITATION LIST

Patent Literature

Patent Literature 1: Japanese Patent No. 2599290

SUMMARY

Technical Problem

However, in some cases, a wire electrical discharge machining apparatus is equipped with a control to reduce the rotational speed fluctuation of the tension motor or a control to reduce the speed difference between the tension roller and the collecting roller. By implementing such controls, the tension fluctuation in the wire electrode is suppressed and, as a result, the machined surface quality is improved. When the above conventional technology is used in a case where such controls are implemented, the tension motor functions such that the rotational speed before a wire breakage is maintained even after the breakage; therefore, there is a problem in that a wire breakage cannot be detected because a speed difference does not occur between the rotational components at two locations on the wire travelling path or the detection of a wire breakage is delayed because it takes a long time until the rotational speed difference occurs.

The present invention has been achieved in view of the above and an object of the present invention is to obtain a wire electrical discharge machining apparatus capable of detecting a wire breakage as soon as possible.

Solution to Problem

In order to solve the above problems and achieve the object, the present invention includes a collecting roller that collects a wire electrode; a collecting motor that causes the wire electrode to travel at a predetermined speed by driving the collecting roller; a tension roller that applies tension to the wire electrode between the tension roller and the collecting roller; a tension motor that drives the tension roller; a speed calculating unit that calculates a rotational speed of the tension motor; a speed fluctuation compensating unit that generates a speed compensation value that suppresses fluctuation of a rotational speed of the tension motor on a basis of a rotational speed output from the speed calculating unit; and a breakage detecting unit that detects a breakage of the wire electrode on a basis of a comparison of a preset breakage detection threshold and a speed compensation value output from the speed fluctuation compensating unit.

Advantageous Effects of Invention

The wire electrical discharge machining apparatus according to the present invention detects a wire breakage on the basis of a speed compensation value that is generated at the same time as the occurrence of a wire breakage and suppresses the speed fluctuation of the tension motor; therefore, an effect is obtained where a wire breakage can be detected as soon as possible.

DESCRIPTION OF EMBODIMENTS

Exemplary embodiments of a wire electrical discharge machining apparatus according to the present invention will be explained below in detail with reference to the drawings. This invention is not limited to these embodiments.

First Embodiment

Figure 1:
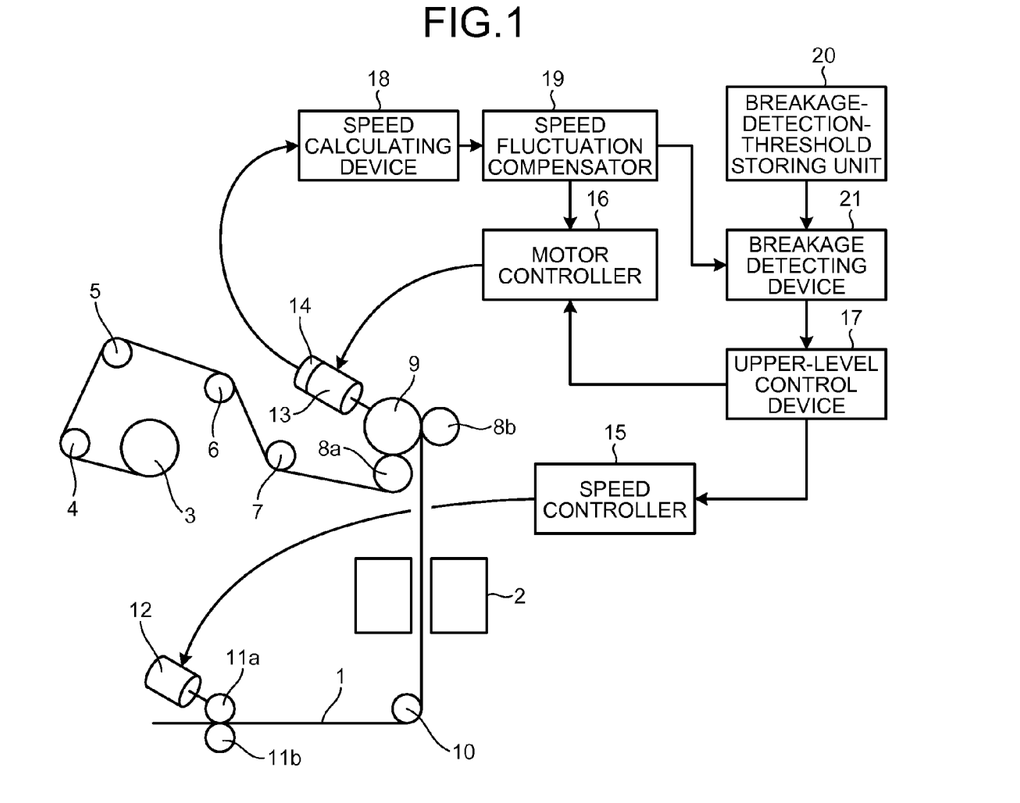
FIG. 1 is a diagram illustrating the configuration of a wire electrical discharge machining apparatus according to a first embodiment.

FIG. 1 is a diagram illustrating the configuration of a wire electrical discharge machining apparatus according to a first embodiment of the present invention. The wire electrical discharge machining apparatus in the first embodiment includes a wire electrode 1, a wire bobbin 3 that supplies the wire electrode 1, wire guide rollers 4, 5, 6, 7, and 10 that are arranged on the path along which the wire electrode 1 travels, collecting rollers 11a and 11b that collect the wire electrode 1 at a predetermined speed, a collecting motor 12 that drives the collecting roller 11a, a speed controller 15 that controls the rotational speed of the collecting motor 12, a tension roller 9 that applies tension to the wire electrode 1, pinch rollers 8a and 8b that press the wire electrode 1 against the tension roller 9, a tension motor 13 that drives the tension roller 9, an encoder 14 that is attached to the tension motor 13, a motor controller 16 that controls the tension motor 13, and an upper-level control device 17 that controls the speed controller 15 and the motor controller 16 at an upper level.

Moreover, the wire electrical discharge machining apparatus in the first embodiment includes a speed calculating device 18 that calculates the rotational speed on the basis of the signal from the encoder 14 attached to the tension motor 13, a speed fluctuation compensator 19 that generates a speed fluctuation suppression command that is a speed compensation value that suppresses the rotational speed fluctuation of the tension motor 13, a breakage-detection-threshold storing unit 20 that stores a setting value of the breakage detection threshold, and a breakage detecting device 21 that detects a breakage of the wire electrode 1 by using the breakage detection threshold stored in the breakage-detection-threshold storing unit 20 and the speed fluctuation suppression command output from the speed fluctuation compensator 19.

Before explaining the operation of the first embodiment, the principle of detecting a breakage (hereinafter, wire breakage) of the wire electrode 1 in the wire electrical discharge machining apparatus according to the first embodiment will be explained below.

In order to improve the machined surface quality, a wire electrical discharge machining apparatus, in some cases, uses a control to suppress the tension fluctuation in the wire electrode 1. Examples of the control include a control to reduce the rotational speed fluctuation of the tension motor 13, a control to reduce the difference between the rotational speed of the collecting roller 11a and the rotational speed of the tension roller 9, and a control to reduce the difference between the rotational speed command to the collecting roller 11a and the rotational speed of the tension roller 9, and these controls reduce the speed fluctuation of the traveling wire electrode 1 and thus the tension fluctuation in the wire electrode 1 is also suppressed. However, when these controls are implemented, the tension motor 13 functions such that the rotational speed before a wire breakage is maintained even after the breakage; therefore, a wire breakage cannot be detected because a speed difference does not occur between the rotational components at two locations on the wire travelling path or the detection of a wire breakage is delayed because it takes a long time until the rotational speed difference occurs.

Figure 2:
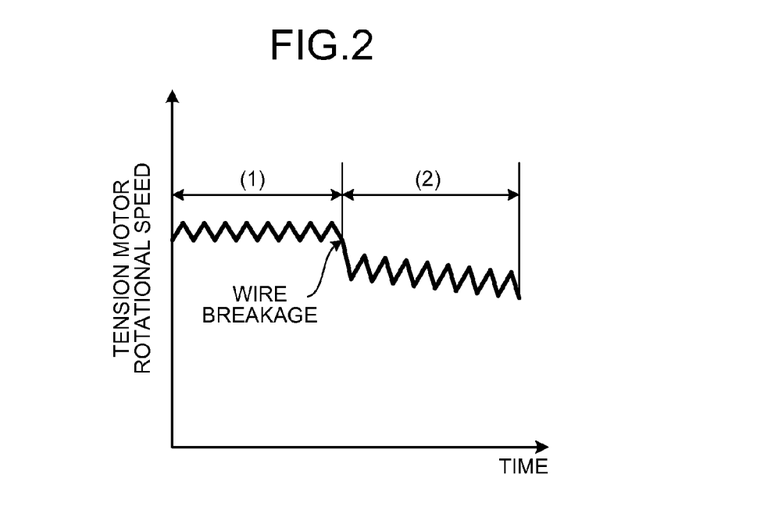
FIG. 2 is a diagram illustrating the rotational speed of a tension motor before and after a wire breakage.
Figure 3:
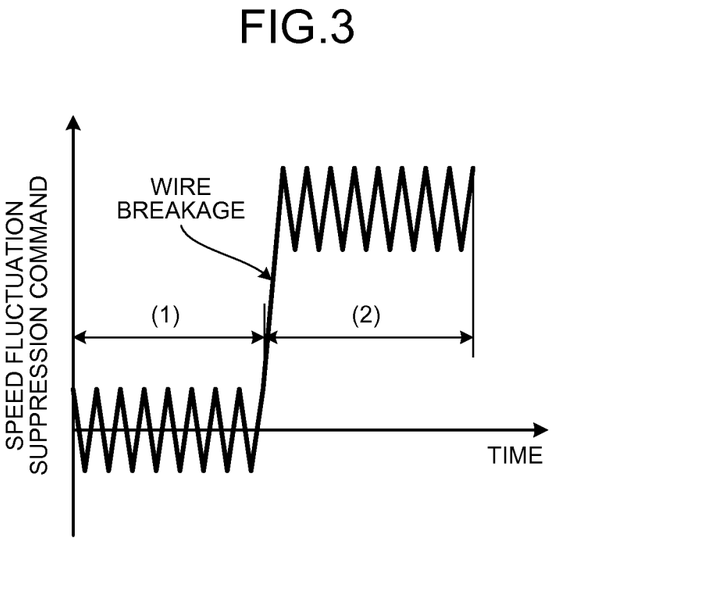
FIG. 3 is a diagram illustrating a speed fluctuation suppression command output from a speed fluctuation compensator before and after a wire breakage.

FIG. 2 is a diagram illustrating the rotational speed of the tension motor 13 before and after a wire breakage and FIG. 3 is a diagram illustrating the speed fluctuation suppression command output from the speed fluctuation compensator 19 before and after a wire breakage. In FIG. 2 and FIG. 3, the rotation direction of the tension roller 9 while the wire is travelling is defined as positive.

The wire electrode 1 during machining is collected at a constant speed by the collecting motor 12 in a state of being tensioned between the tension roller 9 and the collecting rollers 11a and 11b, and the rotational speed of the tension motor 13 becomes as indicated in (1) in FIG. 2. At this point, the speed fluctuation suppression command is a command which suppresses the AC component of the tension motor rotational speed and whose average is zero and becomes as indicated in (1) in FIG. 3.

When the wire electrode 1 breaks, the wire electrode 1 on the side of the collecting roller 11a with respect to the breakage point is collected at a constant speed by the collecting rollers 11a and 11b; however, the wire electrode 1 on the side of the tension roller 9 with respect to the breakage point is not collected by the collecting rollers 11a and 11b. At this point, the speed fluctuation compensator 19 tends to maintain the rotational speed of the tension motor 13 at that before a wire breakage; therefore, the speed fluctuation suppression command whose average is a positive value as indicated in (2) in FIG. 3 continues to be generated and the tension motor does not decelerate immediately even after a breakage as illustrated in (2) in FIG. 2 due to the speed fluctuation suppression command having a positive value. As described above, while the average of the speed fluctuation suppression command before a wire breakage is zero, the speed fluctuation suppression command after a wire breakage continues to have a positive value; therefore, a wire breakage can be detected by focusing attention on the speed fluctuation suppression command.

Next, the operations of the wire electrical discharge machining apparatus in the first embodiment will be explained. The wire electrode 1 is paid out such that it faces a workpiece 2 while being controlled so as to have a predetermined tension and traveling speed. At this point, a pulse voltage is applied to the wire electrode 1 from the machining power source (not illustrated) and the wire electrical discharge machining apparatus performs electrical discharge machining by appropriately controlling the relative distance between the wire electrode 1 and the workpiece 2 with the driving device (not illustrated).

The traveling speed and tension in the wire electrode 1 are controlled as described below. The wire electrode 1 starts from the wire bobbin 3, passes the wire guide rollers 4, 5, 6, 7, and 10, and is collected by the collecting rollers 11a and 11b. Various forms can be considered for the number of guide rollers and the arrangement thereof depending on the type. The collecting rollers 11a and 11b are driven by the collecting motor 12. The traveling speed of the wire electrode 1 is determined according to the machining conditions. The upper-level control device 17 sends a wire travelling speed command to the speed controller 15 and the speed controller 15 controls the speed of the collecting motor 12 such that the travelling speed of the wire electrode 1 becomes the travelling speed commanded by the wire travelling speed command.

The wire electrode 1 is held by the pinch rollers 8a and 8b so that the wire electrode 1 does not slide on the tension roller 9, and the torque generated by the tension motor 13 is transmitted to the wire electrode 1 via the tension roller 9. The tension in the wire electrode 1 is determined in accordance with the machining conditions. A wire tension command is sent to the motor controller 16 from the upper-level control device 17 and the motor controller 16 controls the torque of the tension motor 13 such that a predetermined tension is obtained.

The speed of the tension motor 13 is, in some cases, controlled in order to perform automatic wire threading of the wire electrode and the like, which is other than to control the torque of the tension motor 13; therefore, the encoder 14 is attached to the tension motor 13. The output of the encoder 14 is used for suppressing the rotational speed fluctuation of the tension motor as described below.

The speed calculating device 18 calculates the rotational speed of the tension motor on the basis of the output of the encoder 14 and sends it to the speed fluctuation compensator 19. The speed fluctuation compensator 19 performs highpass filtering on the rotational speed of the tension motor to extract the speed fluctuation (AC component), generates a control command to suppress this speed fluctuation, and sends the control command to the motor controller 16. The cutoff frequency of the highpass filter is sufficiently lower than the frequency component of the speed fluctuation that is required to be suppressed. In addition to controlling the torque of the tension motor 13, the motor controller 16 compensates for the torque so that the speed fluctuation is suppressed.

Figure 4:
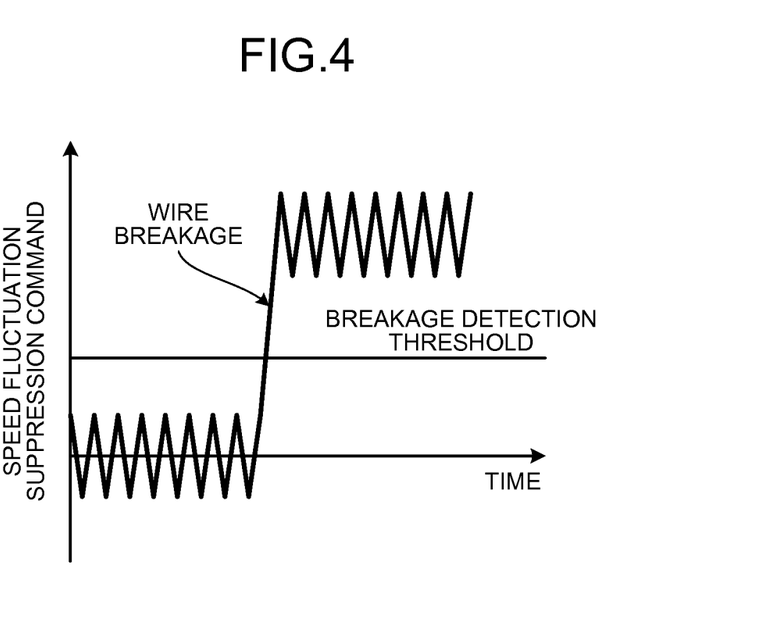
FIG. 4 is a diagram explaining a breakage detection threshold.

The speed fluctuation compensator 19 also sends the speed fluctuation suppression command to the breakage detecting device 21. The breakage-detection-threshold storing unit 20 stores a value that is larger than the speed fluctuation suppression command before a wire breakage and smaller than the speed fluctuation suppression command after a wire breakage as illustrated in FIG. 4 as the breakage detection threshold. The breakage detecting device 21 compares the speed fluctuation suppression command sent from the speed fluctuation compensator 19 and the breakage detection threshold stored in the breakage-detection-threshold storing unit 20 and detects a wire breakage on the basis of the comparison result.

Figure 5:
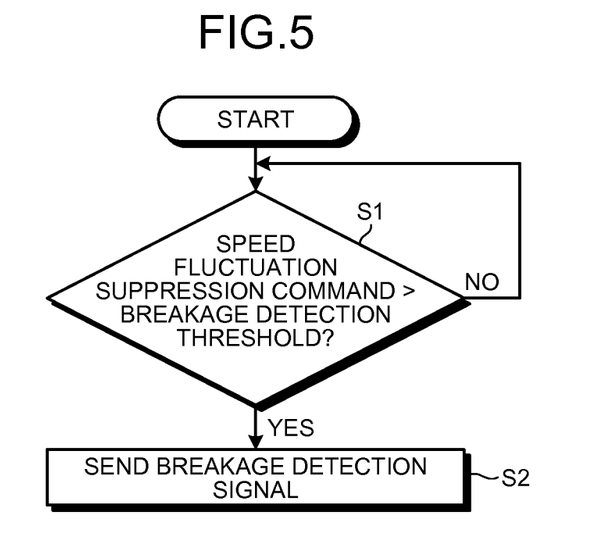
FIG. 5 is a flowchart explaining the operation of a breakage detecting device in the first embodiment.

FIG. 5 is a flowchart explaining the operation of the breakage detecting device 21. As illustrated in FIG. 5, the breakage detecting device 21 determines whether the speed fluctuation suppression command is larger than the breakage detection threshold (Step S1). When the speed fluctuation suppression command is smaller than the breakage detection threshold (No in Step S1), the breakage detecting device 21 repeats the determination process in Step S1 again. When the speed fluctuation suppression command is larger than the breakage detection threshold (Yes in Step S1), the breakage detecting device 21 determines that a wire breakage has occurred and sends a breakage detection signal to the upper-level control device 17 (Step S2).

Upon reception of the breakage detection signal, the upper-level control device 17 sends a command to stop the rotation of the tension motor to the motor controller 16. Moreover, the upper-level control device 17 sends a command to stop generation of discharge pulses to the machining power source (not illustrated).

As described above, according to the first embodiment of the present invention, the speed fluctuation compensator 19, which generates the speed fluctuation suppression command that is a speed compensation value that suppresses fluctuation of the rotational speed of the tension motor 13 on the basis of the rotational speed of the tension motor 13, and the breakage detecting device 21, which detects a breakage of the wire electrode 1 on the basis of the comparison of the preset breakage detection threshold and the speed fluctuation suppression command output from the speed fluctuation compensator 19, are included; therefore, a wire breakage is detected on the basis of the speed fluctuation suppression command that is generated at the same time as the occurrence of a wire breakage and suppresses the speed fluctuation of the tension motor 13. Thus, a wire breakage can be detected immediately compared with a case where a wire breakage is detected on the basis of the rotational speed of the tension motor 13 and the rotational speed of the collecting motor 12. In other words, a wire breakage can be detected as soon as possible. Moreover, because the speed fluctuation suppression command is used to detect a wire breakage, it is not necessary to additionally provide a sensor for detecting a breakage.

Second Embodiment

Figure 6:
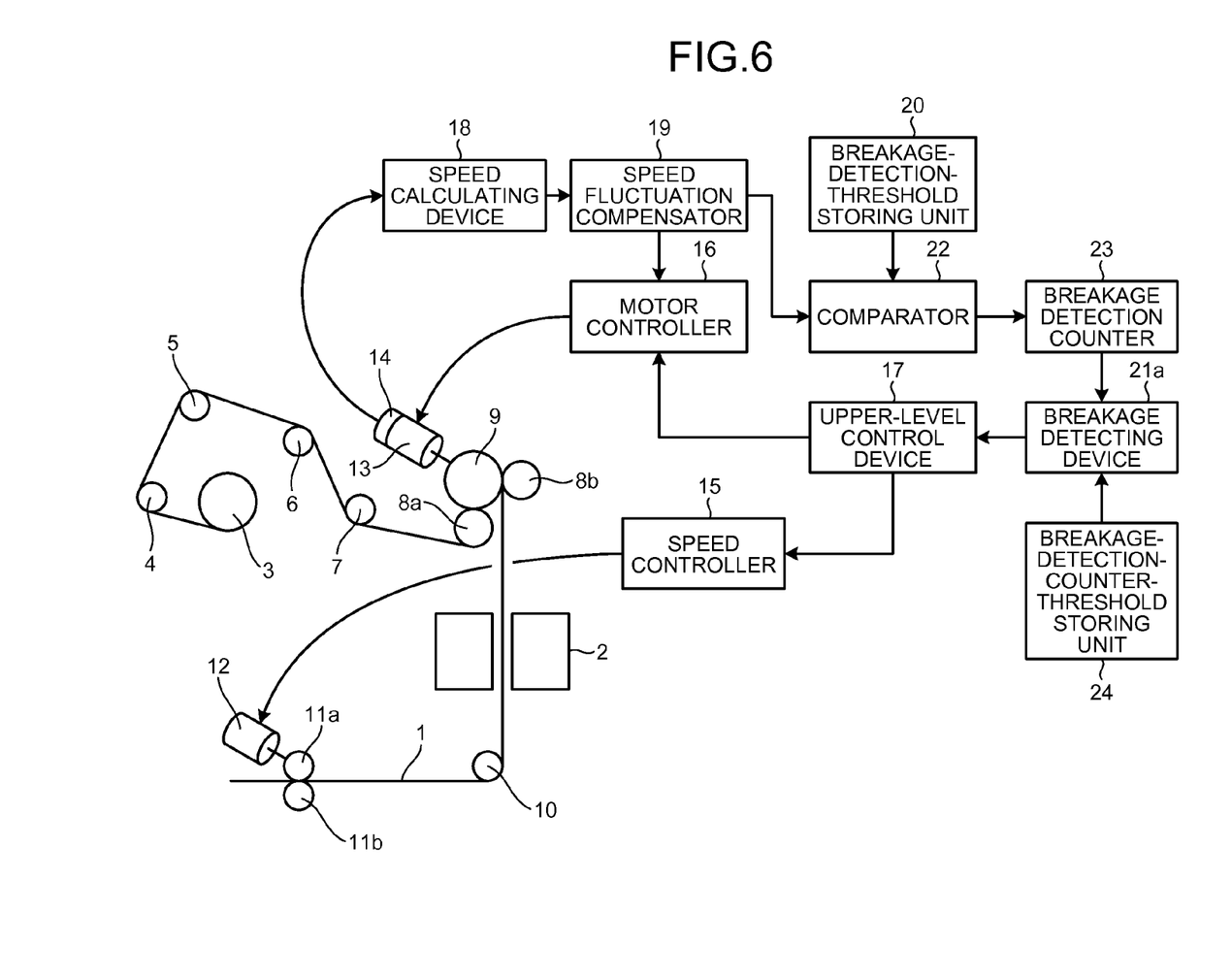
FIG. 6 is a diagram illustrating the configuration of a wire electrical discharge machining apparatus in a second embodiment.

FIG. 6 is a diagram illustrating the configuration of a wire electrical discharge machining apparatus in a second embodiment. In this embodiment, components that are the same as those in the first embodiment are given the same reference numerals and an overlapping explanation is omitted.

As illustrated in FIG. 6, the wire electrical discharge machining apparatus in the second embodiment includes the wire electrode 1, the wire bobbin 3, the wire guide rollers 4, 5, 6, 7, and 10, the pinch rollers 8a and 8b, the tension roller 9, the collecting rollers 11a and 11b, the collecting motor 12, the tension motor 13, the encoder 14, the speed controller 15, the motor controller 16, the upper-level control device 17, the speed calculating device 18, the speed fluctuation compensator 19, the breakage-detection-threshold storing unit 20, a breakage detecting device 21a, a comparator 22, a breakage detection counter 23, and a breakage-detection-counter-threshold storing unit 24.

In other words, the wire electrical discharge machining apparatus in the second embodiment is such that the comparator 22, the breakage detection counter 23, and the breakage-detection-counter-threshold storing unit 24 are added to the configuration of the first embodiment and the breakage detection process of the breakage detecting device 21 is changed.

The comparator 22, the breakage detection counter 23, and the breakage detecting device 21a, which function as a breakage detecting unit in the second embodiment, measure the elapsed time during which the speed fluctuation suppression command continuously exceeds the breakage detection threshold in cooperation with each other and determine that the wire electrode 1 has broken when the measured elapsed time is larger than the preset elapsed time threshold.

Specifically, the comparator 22 compares the speed fluctuation suppression command sent from the speed fluctuation compensator 19 and the breakage detection threshold stored in the breakage-detection-threshold storing unit 20, increments the breakage detection counter 23 when the speed fluctuation suppression command is larger than the breakage detection threshold, and resets the counter to zero when the speed fluctuation suppression command is smaller than the breakage detection threshold. The breakage detecting device 21a determines whether the time during which the speed fluctuation suppression command continuously exceeds breakage detection threshold exceeds the preset elapsed time threshold and detects a wire breakage on the basis of the determination result. In this embodiment, the elapsed time threshold is given by the breakage detection counter threshold stored in the breakage-detection-counter-threshold storing unit 24.

The breakage detection threshold and the breakage detection counter threshold are preset as follows. It is satisfactory if the breakage detection threshold is larger than zero and smaller than the speed fluctuation suppression command after a wire breakage, and the width of the value appropriate for the breakage detection threshold becomes larger than that in the first embodiment. The breakage detection counter threshold is set such that a false detection of a breakage does not occur, for example, when the wire travels after the breakage detection threshold is set to zero. Alternatively, the breakage detection counter threshold may be set such that a false detection of a breakage does not occur even if the wire electrode is momentarily disturbed.

Figure 7:
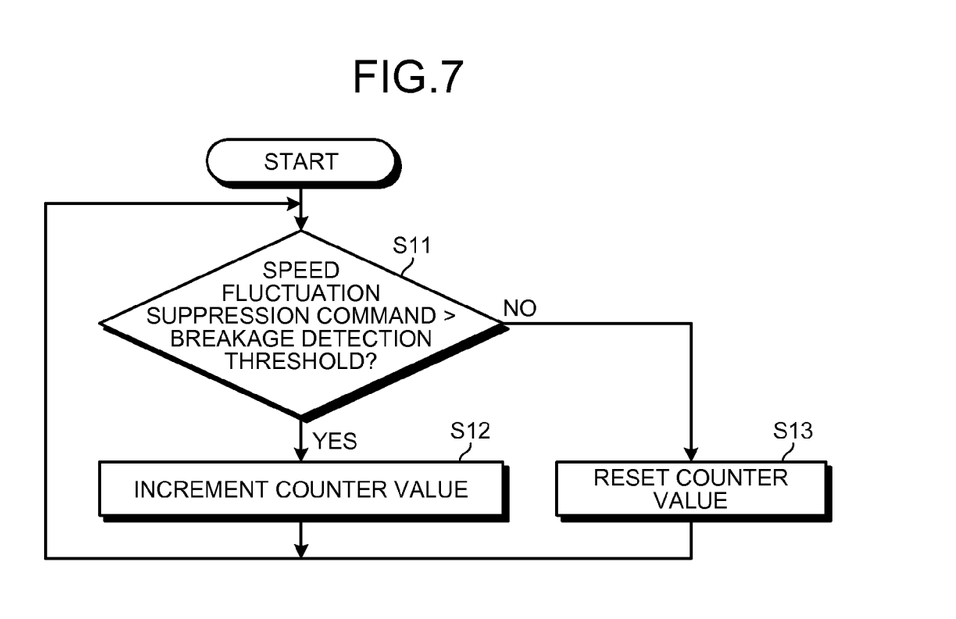
FIG. 7 is a flowchart explaining the operation of a comparator in the second embodiment.
Figure 8:
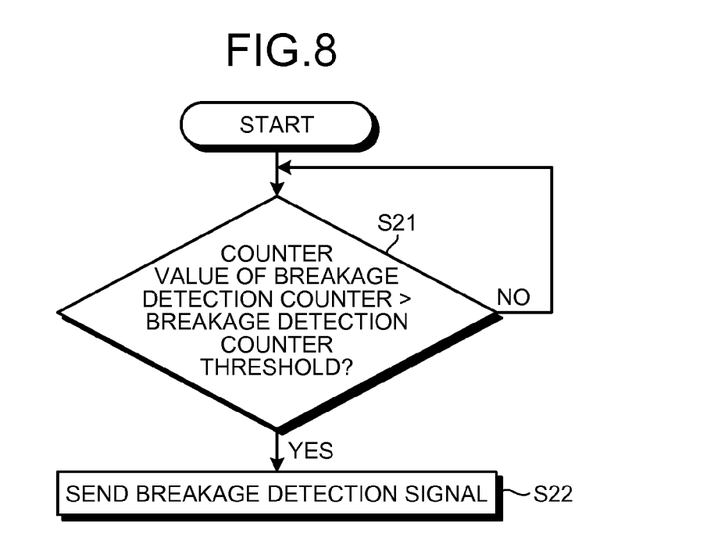
FIG. 8 is a flowchart explaining the operation of a breakage detecting device in the second embodiment.

FIG. 7 is a flowchart explaining the operation of the comparator 22 and FIG. 8 is a flowchart explaining the operation of the breakage detecting device 21a.

As illustrated in FIG. 7, the comparator 22 determines whether the speed fluctuation suppression command is larger than the breakage detection threshold (Step S11). When the speed fluctuation suppression command is larger than the breakage detection threshold (Yes in Step S11), the comparator 22 increments the counter value of the breakage detection counter 23 (Step S12). When the speed fluctuation suppression command is smaller than the breakage detection threshold (No in Step S11), the comparator 22 resets the counter value of the breakage detection counter 23 (Step S13). After the process in Step S12 or Step S13, the comparator 22 proceeds to the process in Step S11.

The process in Step S11 is performed every predetermined period, for example, every operation period. Accordingly, the processes in Steps S11 to Step S13 are equivalent to measuring the time during which the speed fluctuation suppression command continuously exceeds the breakage detection threshold.

As illustrated in FIG. 8, the breakage detecting device 21a determines whether the counter value of the breakage detection counter 23 is larger than the breakage detection counter threshold (Step S21). When the counter value is smaller than the breakage detection counter threshold (No in Step S21), the breakage detecting device 21a repeats the determination process in Step S21 again. When the counter value is larger than the breakage detection counter threshold (Yes in Step S21), the breakage detecting device 21a determines that a wire breakage has occurred and sends a breakage detection signal to the upper-level control device 17 (Step S22).

In the above explanation, the time during which the speed fluctuation suppression command exceeds the breakage detection threshold is calculated by the counter and the time at which the occurrence of a breakage is detected is also given by a counter value; however, the unit that calculates the time during which the speed fluctuation suppression command exceeds the breakage detection threshold is not limited to the counter and the time at which the occurrence of a breakage is detected is set by any method without being limited to a method of being given by a counter value.

As described above, according to the second embodiment, the breakage detecting unit (the comparator 22, the breakage detection counter 23, and the breakage detecting device 21a) is configured to measure the elapsed time during which the speed fluctuation suppression command continuously exceeds the breakage detection threshold and determines that the wire electrode 1 has broken when the measured elapsed time is larger than the preset elapsed time threshold; therefore, even if the speed fluctuation suppression command momentarily becomes large when a wire breakage has not occurred, a false detection of a wire breakage can be prevented.

Third Embodiment

Figure 9:
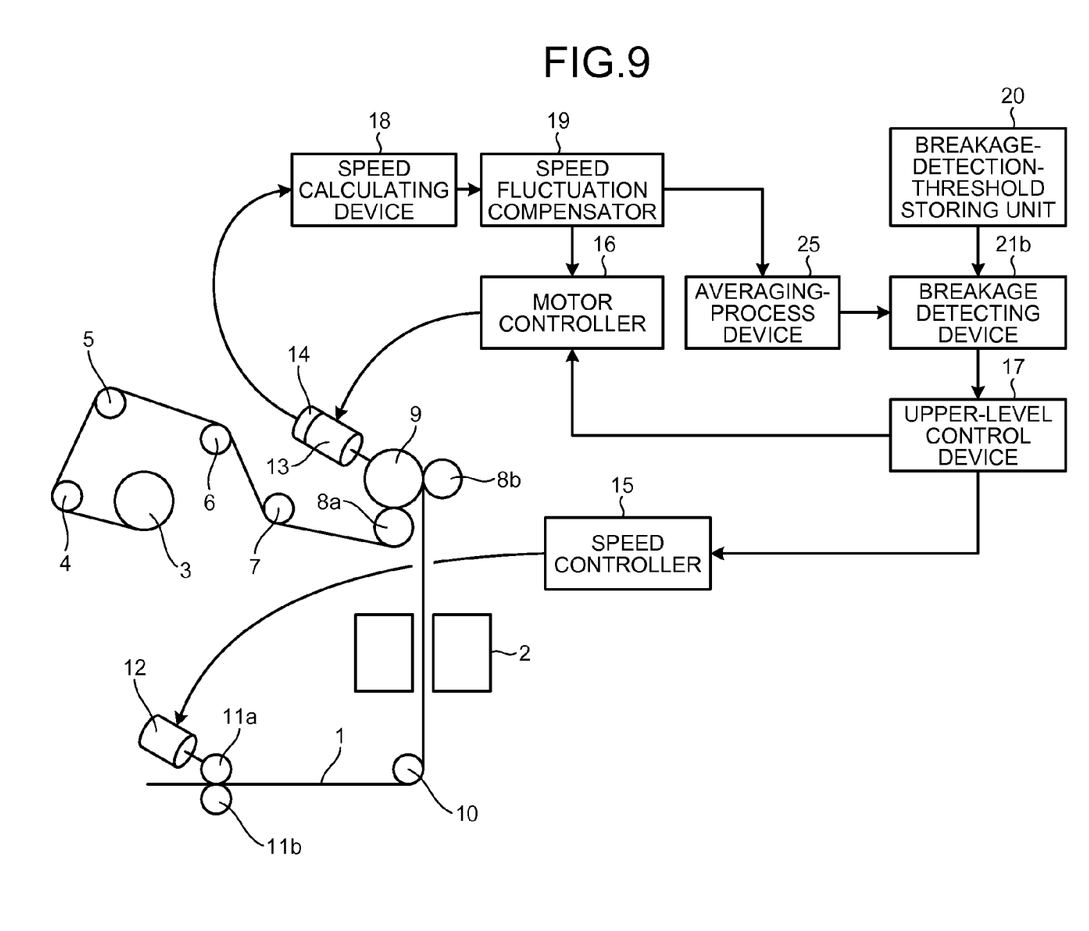
FIG. 9 is a diagram illustrating the configuration of a wire electrical discharge machining apparatus in a third embodiment.

FIG. 9 is a diagram illustrating the configuration of a wire electrical discharge machining apparatus in a third embodiment. In this embodiment, components that are the same as those in the first embodiment are given the same reference numerals and an overlapping explanation is omitted.

As illustrated in FIG. 9, the wire electrical discharge machining apparatus in the third embodiment includes the wire electrode 1, the wire bobbin 3, the wire guide rollers 4, 5, 6, 7, and 10, the pinch rollers 8a and 8b, the tension roller 9, the collecting rollers 11a and 11b, the collecting motor 12, the tension motor 13, the encoder 14, the speed controller 15, the motor controller 16, the upper-level control device 17, the speed calculating device 18, the speed fluctuation compensator 19, the breakage-detection-threshold storing unit 20, a breakage detecting device 21b, and an averaging-process device 25.

In other words, the configuration of the wire electrical discharge machining apparatus in the third embodiment is such that the averaging-process device 25 is added to the configuration of the first embodiment and the breakage detection process of the breakage detecting device 21 is changed.

The averaging-process device 25 and the breakage detecting device 21b, which function as a breakage detecting unit in the third embodiment, perform the averaging process on the speed fluctuation suppression command in cooperation with each other and determine that the wire electrode 1 has broken when the speed fluctuation suppression command after the averaging process is larger than the breakage detection threshold.

Specifically, the averaging-process device 25 averages the speed fluctuation suppression command sent from the speed fluctuation compensator 19. For the averaging process, for example, lowpass filtering, a moving averaging process, and the like are used. The corner frequency in the averaging process is set to be lower than the fluctuation frequency of the speed fluctuation suppression command while the wire is travelling. The breakage detecting device 21b detects a wire breakage on the basis of a comparison of the speed fluctuation suppression command averaged by the averaging-process device 25 and the breakage detection threshold stored in the breakage-detection-threshold storing unit 20.

Figure 10:
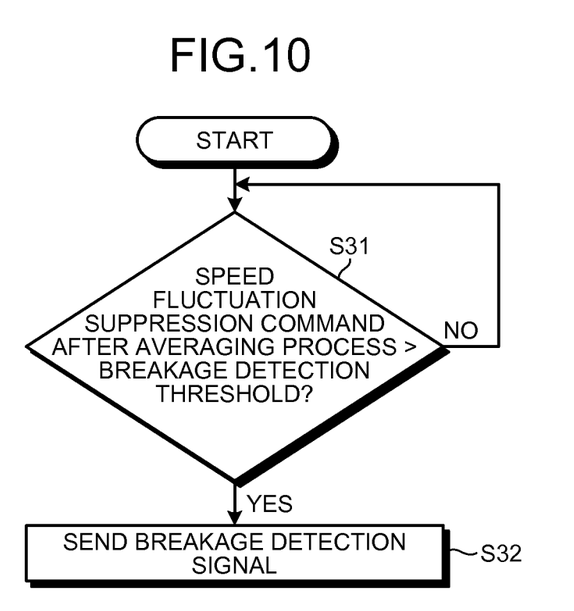
FIG. 10 is a flowchart explaining the operation of a breakage detecting device in the third embodiment.

FIG. 10 is a flowchart explaining the operation of the breakage detecting device 21b. As illustrated in FIG. 10, the breakage detecting device 21b determines whether the speed fluctuation suppression command after the averaging process is larger than the breakage detection threshold (Step S31). When the speed fluctuation suppression command after the averaging process is smaller than the breakage detection threshold (No in Step S31), the breakage detecting device 21b repeats the determination process in Step S31 again. When the speed fluctuation suppression command after the averaging process is larger than the breakage detection threshold (Yes in Step S31), the breakage detecting device 21b determines that a wire breakage has occurred and sends a breakage detection signal to the upper-level control device 17 (Step S32).

As described above, according to the third embodiment, the breakage detecting unit is configured to perform the averaging process on the speed fluctuation suppression command and determine that the wire electrode 1 has broken when the speed fluctuation suppression command after the averaging process is larger than the breakage detection threshold; therefore, in a similar manner to the second embodiment, even if the speed fluctuation suppression command momentarily becomes large when a wire breakage has not occurred, a false detection of a wire breakage can be prevented.

Fourth Embodiment

Figure 11:
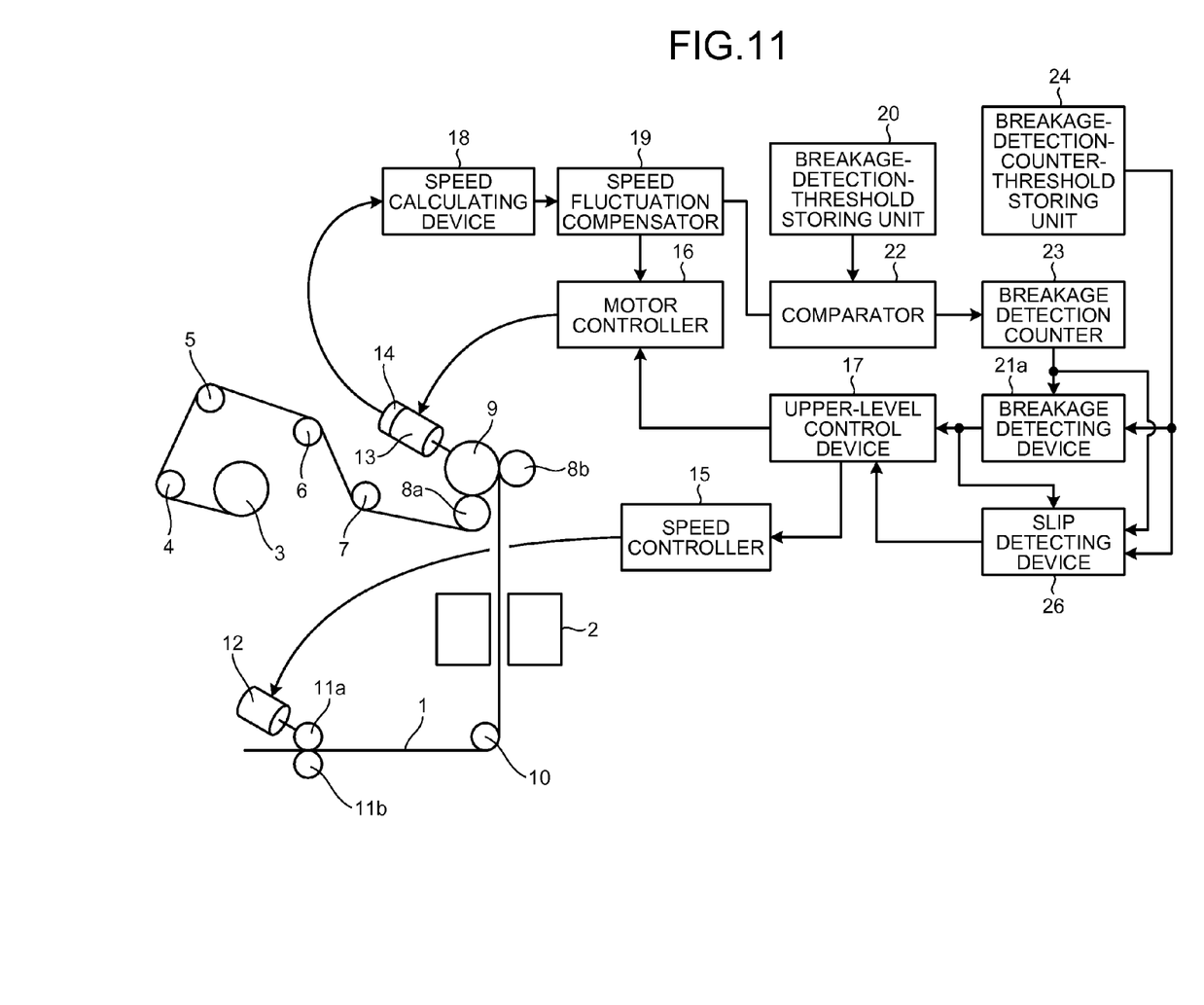
FIG. 11 is a diagram explaining the configuration of a wire electrical discharge machining apparatus in a fourth embodiment.

FIG. 11 is a diagram explaining the configuration of a wire electrical discharge machining apparatus in a fourth embodiment. In this embodiment, components that are the same as those in the second embodiment are given the same reference numerals and an overlapping explanation is omitted.

As illustrated in FIG. 11, the wire electrical discharge machining apparatus in the fourth embodiment includes the wire electrode 1, the wire bobbin 3, the wire guide rollers 4, 5, 6, 7, and 10, the pinch rollers 8a and 8b, the tension roller 9, the collecting rollers 11a and 11b, the collecting motor 12, the tension motor 13, the encoder 14, the speed controller 15, the motor controller 16, the upper-level control device 17, the speed calculating device 18, the speed fluctuation compensator 19, the breakage-detection-threshold storing unit 20, the breakage detecting device 21a, the comparator 22, the breakage detection counter 23, the breakage-detection-counter-threshold storing unit 24, and a slip detecting device 26.

In other words, the wire electrical discharge machining apparatus in the fourth embodiment is such that the slip detecting device 26 is added to the configuration of the second embodiment.

The comparator 22, the breakage detection counter 23, and the slip detecting device 26, which function as a slip detecting unit, measure the elapsed time during which the speed fluctuation suppression command continuously exceeds the breakage detection threshold in cooperation with each other and determine that slip of the wire electrode has occurred when the speed fluctuation suppression command becomes equal to or smaller than the breakage detection threshold without the measured elapsed time reaching the elapsed time threshold.

Due to the aging of the rotational components (the wire guide rollers 4, 5, 6, 7, and 10, the pinch rollers 8a and 8b, the tension roller 9, the collecting rollers 11a and 11b, and the like) on the wire travelling path, slip occurs in some cases between the wire electrode 1 and the rotational components. When slip of the wire electrode 1 occurs, the tension fluctuation in the wire electrode 1 increases and thus the machined surface quality decreases. Therefore, the rotational components in the wire travelling system, which deteriorate over time, are often service parts. However, slip of the wire electrode 1 may occur because the replacement of a service part is forgotten and the machined surface quality may therefore decrease. Moreover, slip of the wire electrode may occur before the replacement time of a service part and the machined surface quality may decrease.

Figure 12:
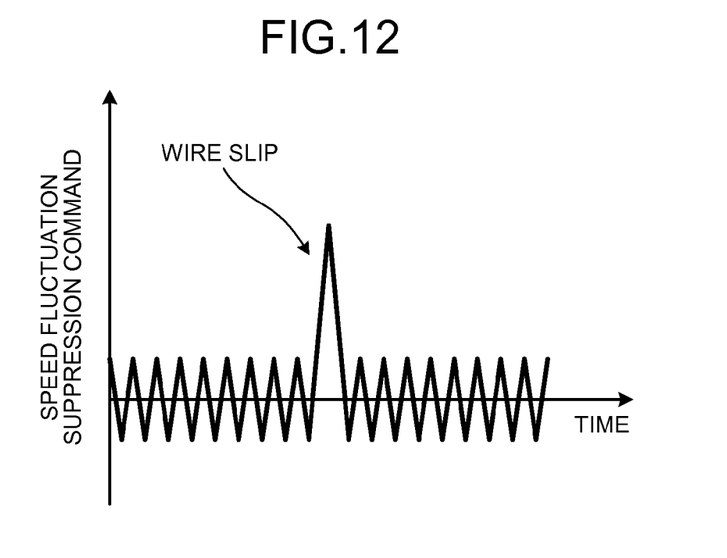
FIG. 12 is a diagram illustrating a speed fluctuation suppression command when slip of a wire electrode occurs.

When the rotation direction of the tension motor 13 while the wire is traveling is defined as positive, the speed fluctuation suppression command output from the speed fluctuation compensator 19 after a wire breakage continues to have a positive value. In contrast, when slip of the wire electrode has occurred, as illustrated in FIG. 12, the speed fluctuation suppression command temporarily becomes a large positive value; however, the speed fluctuation suppression command does not continue to have a positive value. Accordingly, it is possible to determine whether slip of the wire electrode has occurred by focusing attention on a temporary increase of the speed fluctuation suppression command. When wire slip is detected, an alarm is triggered to prompt the operator to replace a service part, whereby the machined surface quality can be prevented from decreasing.

In FIG. 11, the comparator 22 compares the speed fluctuation suppression command sent from the speed fluctuation compensator 19 and the breakage detection threshold stored in the breakage-detection-threshold storing unit 20. When the speed fluctuation suppression command is larger than the breakage detection threshold, the comparator 22 increments the breakage detection counter 23, and, when the speed fluctuation suppression command is smaller than the breakage detection threshold, the comparator 22 resets the counter to zero. The slip detecting device 26 monitors the counter value of the breakage detection counter 23 and the breakage detection signal sent from the breakage detecting device 21a, and, when the breakage detection counter 23 is reset to zero before reaching the counter value set in the breakage-detection-counter-threshold storing unit 24 after the breakage detection counter 23 is incremented, the slip detecting device 26 determines that slip of the wire electrode 1 has occurred and sends a slip detection signal to the upper-level control device 17. Upon reception of the slip detection signal, the upper-level control device 17 prompts the operator to replace a service part, for example, by triggering an alarm to give a notification of the occurrence of slip of the wire electrode on a display (not illustrated) of the upper-level control device 17.

Figure 13:
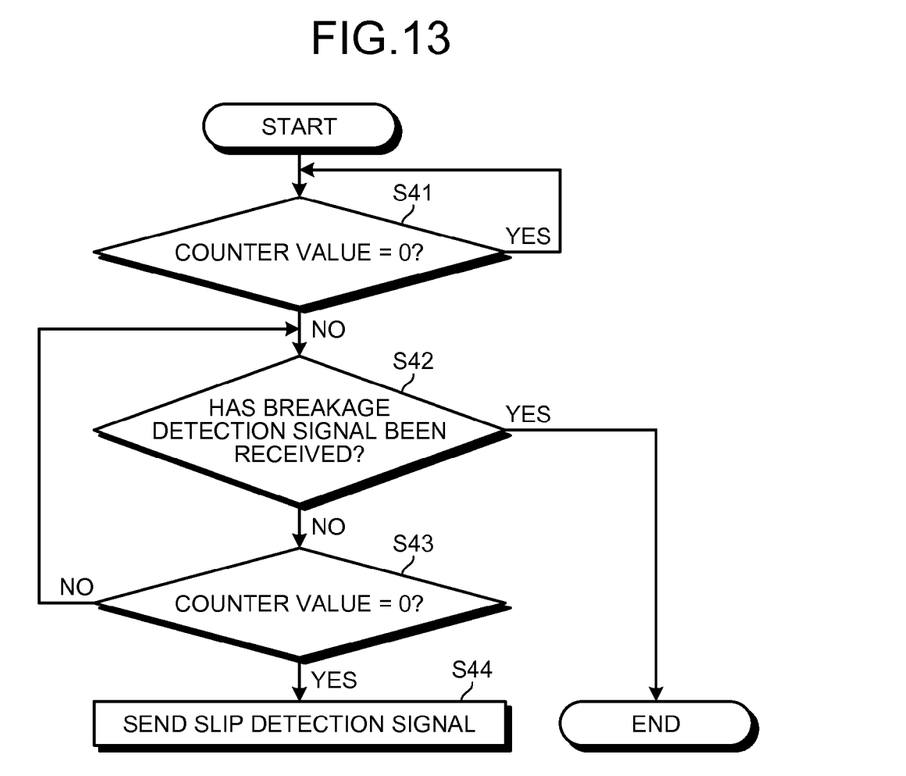
FIG. 13 is a flowchart explaining the operation of a slip detecting device in the fourth embodiment.

FIG. 13 is a flowchart explaining the operation of the slip detecting device 26. As illustrated in FIG. 13, when the operation is started, the slip detecting device 26 determines whether the counter value of the breakage detection counter 23 is zero (Step S41). When the counter value is zero (Yes in Step S41), the slip detecting device 26 performs the determination process in Step S41 again. When the counter value is not zero (No in Step S41), i.e., when the counter value is one or larger, the slip detecting device 26 further determines the presence or absence of reception of a breakage detection signal (Step S42). When the breakage detection signal has been received (Yes in Step S42), the slip detecting device 26 ends the operation. When the breakage detection signal has not been received (No in Step S42), the slip detecting device 26 again determines whether the counter value of the breakage detection counter 23 is zero (Step S43). When the counter value is zero (Yes in Step S43), the slip detecting device 26 sends a slip detection signal to the upper-level control device 17 (Step S44). When the counter value is not zero (No in Step S43), the slip detecting device 26 proceeds to the process in Step S42.

As described above, according to the fourth embodiment, the configuration is such that the slip detecting unit, which measures the elapsed time during which the speed fluctuation suppression command continuously exceeds the breakage detection threshold and determines that slip of the wire electrode has occurred when the speed fluctuation suppression command becomes equal to or smaller than the breakage detection threshold without the measured elapsed time reaching the elapsed time threshold, is further included. Therefore, slip of the wire electrode 1 can be detected in addition to a wire breakage being detected as soon as possible.

The fourth embodiment is explained such that the slip detecting unit is added to the second embodiment; however, it is obvious that the configuration may be such that the slip detecting unit is added to any one of the first to third embodiments.

Moreover, in the above explanation, the same value is used as the breakage detection counter threshold stored in the breakage-detection-counter-threshold storing unit 24 for the breakage detecting device 21a and the slip detecting device 26; however, different values may be set for the respective devices.

Moreover, part or all of the speed controller 15, the motor controller 16, the upper-level control device 17, the speed calculating device 18, the speed fluctuation compensator 19, the breakage detecting device 21a, the comparator 22, the breakage detection counter 23, the averaging-process device 25, and the slip detecting device 26, which are components of the wire electrical discharge machining apparatuses in the first to fourth embodiments, may be implemented as any of hardware and software or a combination thereof. Implementation as software means implementing the function of a component by storing a module program corresponding to the component in a storage device and executing the program module stored in the storage device by a computing device in a computer that includes the computing device and the storage device.

REFERENCE SIGNS LIST 1 wire electrode
2 workpiece
3 wire bobbin
4, 5, 6, 7, 10 wire guide roller
8a, 8b pinch roller
9 tension roller
11a, 11b collecting roller
12 collecting motor
13 tension motor
14 encoder
15 speed controller
16 motor controller
17 upper-level control device
18 speed calculating device
19 speed fluctuation compensator
20 breakage-detection-threshold storing unit
21, 21a, 21b breakage detecting device
22 comparator
23 breakage detection counter
24 breakage-detection-counter-threshold storing unit
25 averaging process device
26 slip detecting device

The invention claimed is:

1. A wire electrical discharge machining apparatus comprising:
   a collecting roller that collects a wire electrode;
   a collecting motor that causes the wire electrode to travel at a predetermined speed by driving the collecting roller;
   a tension roller that applies tension to the wire electrode between the tension roller and the collecting roller;
   a tension motor that drives the tension roller;
   a speed calculating unit that calculates a rotational speed of the tension motor;
   a speed fluctuation compensating unit that generates a speed compensation value that suppresses fluctuation of a rotational speed of the tension motor on a basis of a rotational speed output from the speed calculating unit; and
   a breakage detecting unit that detects a breakage of the wire electrode on a basis of a comparison of a preset breakage detection threshold and a speed compensation value output from the speed fluctuation compensating unit,
   wherein the speed compensation value is generated before detecting a speed difference between a wire speed at the tension roller and a wire speed at the collecting roller.

2. The wire electrical discharge machining apparatus according to claim 1, wherein the breakage detecting unit issues a notification indicating that the wire electrode has broken when a speed compensation value output from the speed fluctuation compensating unit is larger than the breakage detection threshold and does not issue a notification indicating that the wire electrode has broken when a speed compensation value output from the speed fluctuation compensating unit is smaller than the breakage detection threshold.

3. The wire electrical discharge machining apparatus according to claim 1, wherein the breakage detecting unit measures an elapsed time during which a speed compensation value output from the speed fluctuation compensating unit continuously exceeds the breakage detection threshold, issues a notification indicating that the wire electrode has broken when the measured elapsed time is larger than a preset first elapsed time threshold, and does not issue a notification indicating that the wire electrode has broken when the measured elapsed time is smaller than the first elapsed time threshold.

4. The wire electrical discharge machining apparatus according to claim 1, wherein the breakage detecting unit performs an averaging process on a speed compensation value output from the speed fluctuation compensating unit, issues a notification indicating that the wire electrode has broken when a speed compensation value after the averaging process is larger than the breakage detection threshold, and does not issue a notification indicating that the wire electrode has broken when a speed compensation value after the averaging process is smaller than the breakage detection threshold.

5. The wire electrical discharge machining apparatus according to any one of claim 1, further comprising a slip detecting unit that measures an elapsed time during which a speed compensation value output from the speed fluctuation compensating unit continuously exceeds the breakage detection threshold and issues a notification indicating that slip of the wire electrode is detected when the speed compensation value becomes equal to or smaller than the breakage detection threshold without the measured elapsed time reaching a preset second elapsed time threshold.

6. The wire electrical discharge machining apparatus according to claim 1, wherein the speed compensation value is generated at the same time as the occurrence of the wire breakage.

7. The wire electrical discharge machining apparatus according to claim 1, wherein the speed fluctuation comprises an AC component of the tension motor rotational speed and the speed compensation value suppresses the AC component of the tension motor rotational speed.

8. The wire electrical discharge machining apparatus according to claim 1, wherein the average of the speed compensation value is zero.

9. The wire electrical discharge machining apparatus according to claim 7, the speed fluctuation compensating unit performs high-pass filtering on the rotational speed of the tension motor to extract the AC component of the tension motor rotational speed.

10. The wire electrical discharge machining apparatus according to claim 9, a cut-off frequency of a high-pass filter is lower than a frequency component of the speed fluctuation that is required to be suppressed.

* * * * *